US008303402B2

(12) United States Patent
Aoki et al.

(10) Patent No.: US 8,303,402 B2
(45) Date of Patent: Nov. 6, 2012

(54) WAGERING GAME WITH SPECIAL EVENT SHARED BY ADJACENT GAMING MACHINES

(75) Inventors: Dion K. Aoki, Henderson, NV (US); Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1289 days.

(21) Appl. No.: 11/990,380

(22) PCT Filed: Sep. 8, 2006

(86) PCT No.: PCT/US2006/034956

§ 371 (c)(1),
(2), (4) Date: Feb. 12, 2008

(87) PCT Pub. No.: WO2007/030675

PCT Pub. Date: Mar. 15, 2007

(65) Prior Publication Data

US 2009/0124366 A1 May 14, 2009

Related U.S. Application Data

(60) Provisional application No. 60/715,982, filed on Sep. 9, 2005.

(51) Int. Cl.
*A63F 13/00* (2006.01)

(52) U.S. Cl. ................ 463/27; 463/16; 463/17; 463/18; 463/19; 463/20; 463/25; 463/26; 463/40; 463/42; 463/43

(58) Field of Classification Search .............. 463/16–20, 463/31, 39–43, 25–28
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,861,041 | A | 8/1989 | Jones et al. | 273/292 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/12 |
| 5,280,909 | A | 1/1994 | Tracy | 273/138 A |

(Continued)

FOREIGN PATENT DOCUMENTS

CA 2 334 546 8/2001

(Continued)

OTHER PUBLICATIONS

Article for "Easy Riches" by Sigma Game, Strictly Slots, 1 page (Aug. 2001).

(Continued)

*Primary Examiner* — Sunit Pandya
(74) *Attorney, Agent, or Firm* — Nixon Peabody LLP

(57) ABSTRACT

A method of conducting a plurality of wagering games on a group of gaming machines includes receiving wagers from players at the group of gaming machines. In response to a triggering condition associated with a gaming machine of the group of gaming machines, the method further includes presenting a special event on the gaming machine, and changing a set of wagering game symbols required to achieve a known award on at least another one of the group of gaming machines.

25 Claims, 6 Drawing Sheets

U.S. PATENT DOCUMENTS

| | | | | |
|---|---|---|---|---|
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A * | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,347,996 | B1 | 2/2002 | Gilmore et al. | 463/17 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 * | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,869,361 | B2 | 3/2005 | Sharpless et al. | 463/25 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 2002/0132658 | A1 | 9/2002 | Brown et al. | 436/16 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148807 | A1 | 8/2003 | Acres | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0092304 | A1 | 5/2004 | George | 463/29 |
| 2005/0003880 | A1 | 1/2005 | Engleman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073887 | A1 | 4/2006 | Nguyen et al. | 463/20 |
| 2006/0073889 | A1 | 4/2006 | Edidin et al. | 463/27 |
| 2006/0116201 | A1 | 6/2006 | Gauselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |

| | | | | | |
|---|---|---|---|---|---|
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |

FOREIGN PATENT DOCUMENTS

| | | | |
|---|---|---|---|
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Millioniser” by Glenn Haussman, Strictly Slots, pp. 50-53, 4 pages (Mar. 2004).
Product Sheet for “Big Games Safari,” IGT, 24 pages (2000).
“New ’97 Games,” International Gaming & Wagering Business, 24 pages (Mar. 1997).
PCT International Search Report for International Application No. PCT/US2006/20979 dated Nov. 13, 2006 (2 pages).
PCT International Search Report for International Application No. PCT/US2006/034956 mailed on Feb. 27, 2007 (3 pages).

* cited by examiner

WAGERING GAME WITH SPECIAL EVENT SHARED BY ADJACENT GAMING MACHINES

CROSS REFERENCE TO RELATED APPLICATIONS

This application is a U.S. national stage application of International Application No. PCT/US2006/034956, filed Sep. 8, 2006, which is related to and claims priority to U.S. Provisional patent application Ser. No. 60/715,982, filed Sep. 9, 2005, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and, more particularly, to a gaming system including a special event that is shared by a triggering gaming machine and other gaming machines of a bank of gaming machines.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by increasing the entertainment value and excitement for the player.

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game and progressive award concepts offers tremendous advantages in player appeal and excitement relative to other known games, and because such games are attractive to both players and operators, there is a continuing need to develop gaming machines with new types of bonus games to satisfy the demands of players and operators.

While these player appeal features provide some enhanced excitement relative to other known games, there is a continuing need to develop new features for gaming machines to satisfy the demands of players and operators. Specifically, some of the current games provide enhanced excitement solely to a successful player playing on one gaming machine of a bank of gaming machines. Thus, there is a need for sharing the enhanced excitement of the successful player with other players playing on the bank of gaming machines.

SUMMARY OF THE INVENTION

According to one aspect of the present invention, a method of conducting a plurality of wagering games on a group of gaming machines includes receiving wagers from players at the group of gaming machines. In response to a triggering condition associated with a gaming machine of the group of gaming machines, the method further includes presenting a special event on the gaming machine, and changing a set of wagering game symbols required to achieve a known award on at least another one of the group of gaming machines.

According to another aspect of the invention, a gaming system for playing a plurality of wagering games includes a first gaming machine, a second gaming machine, and a controller. The first gaming machine includes a first display for displaying a first one of the plurality of wagering games in response to receiving a first wager from a first player. The second gaming machine includes a second display for displaying a second one of the plurality of wagering games in response to receiving a second wager from a second player. The controller is coupled to the first gaming machine and the second gaming machine. The controller is programmed to, in response to a special event associated with the first gaming machine, cause a change to a set of wagering game symbols required to achieve a known award on the second gaming machine.

According to yet another aspect of the invention, a method is directed to conducting a plurality of wagering games on a group of gaming machines which includes a first gaming machine, a second gaming machine, and a third gaming machine. The method includes receiving wagers from players at the group of gaming machines for playing the plurality of wagering games. In response to triggering a first special event at the first gaming machine, the method further includes changing a first set of wagering game symbols required to achieve a first known award on the second gaming machine. In response to triggering a second special event at the second gaming machine, the method also includes changing a second set of wagering game symbols required to achieve a second known award on the third gaming machine. The triggering of the second special event occurs during the first special event.

According to yet another aspect of the invention, a method is directed to conducting a plurality of wagering games on a group of gaming machines. The method includes receiving wagers from players at the group of gaming machines for playing the plurality of wagering games. The group of gaming machines includes a first gaming machine and a second gaming machine. The method further includes, in response to a triggering condition associated with the first gaming machine, awarding a free spins award to the second gaming machine.

According to yet another aspect of the invention, a gaming system is directed to playing a plurality of wagering games. The gaming system includes a first gaming machine, a second gaming machine, and a controller. The first gaming machine includes a first display for displaying a first one of the plurality of wagering games in response to receiving a first wager from a first player. The second gaming machine includes a second display for displaying a second one of the plurality of wagering games in response to receiving a second wager from a second player. The controller is coupled to the first gaming machine and to the second gaming machine. The controller is programmed to, in response to a triggering condition associated with the first gaming machine, award a free spins award to the second gaming machine.

According to yet another aspect of the invention, a gaming system is directed to playing a plurality of wagering games. The gaming system includes a first gaming machine having a first display for displaying a first one of the plurality of wagering games in response to receiving a first wager from the first player. The gaming system further includes a second gaming machine linked to the first gaming machine. The second gaming machine includes a second display for displaying a second one of the plurality of wagering games in response to receiving a second wager from a second player. The second player is eligible for a progressive jackpot while playing a second wagering game. In response to a special event occurring at the first gaming machine, the progressive jackpot is more likely to be achieved by the second player at the second gaming machine.

According to yet another aspect of the invention, a computer readable storage medium or media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
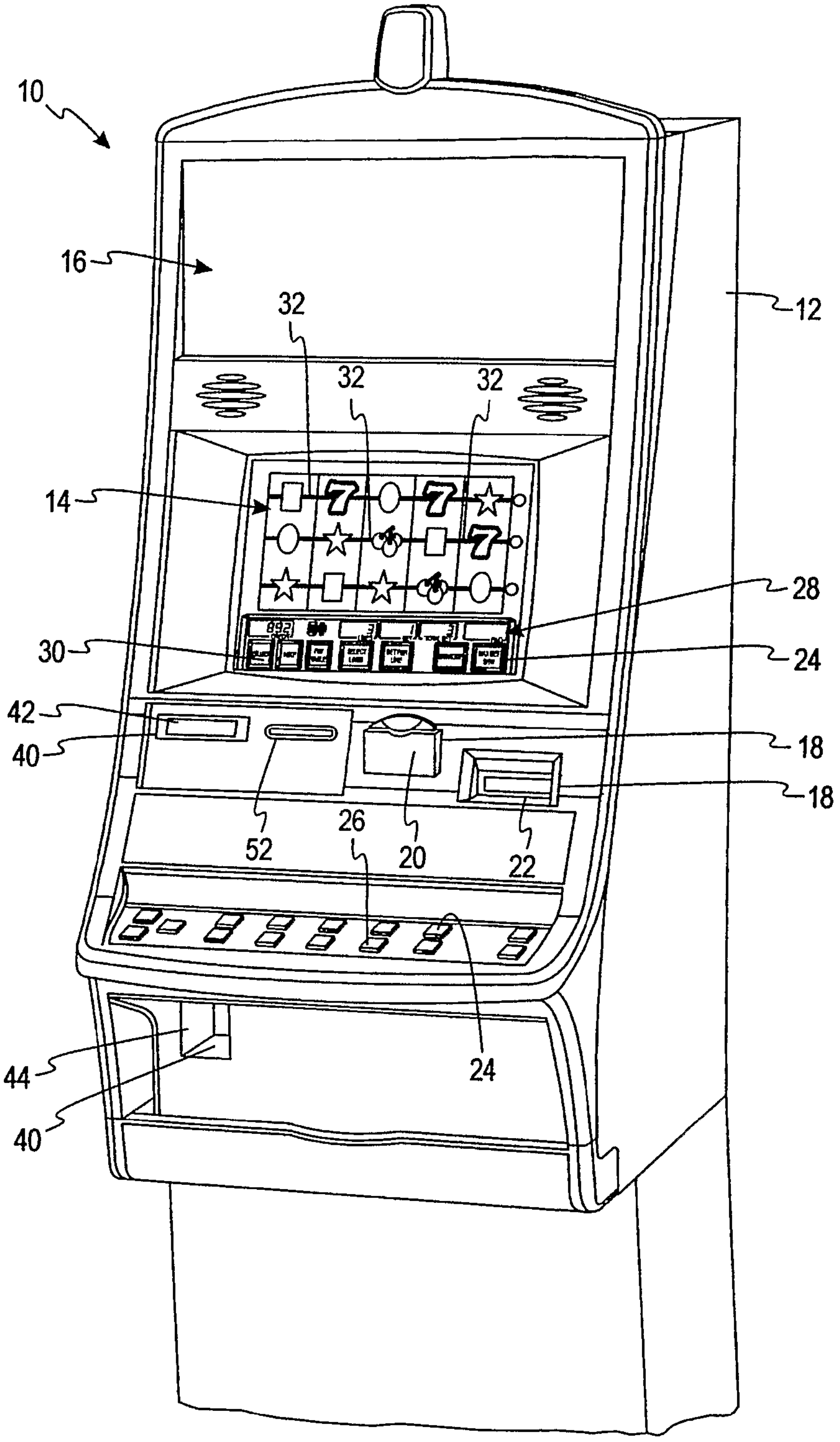
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
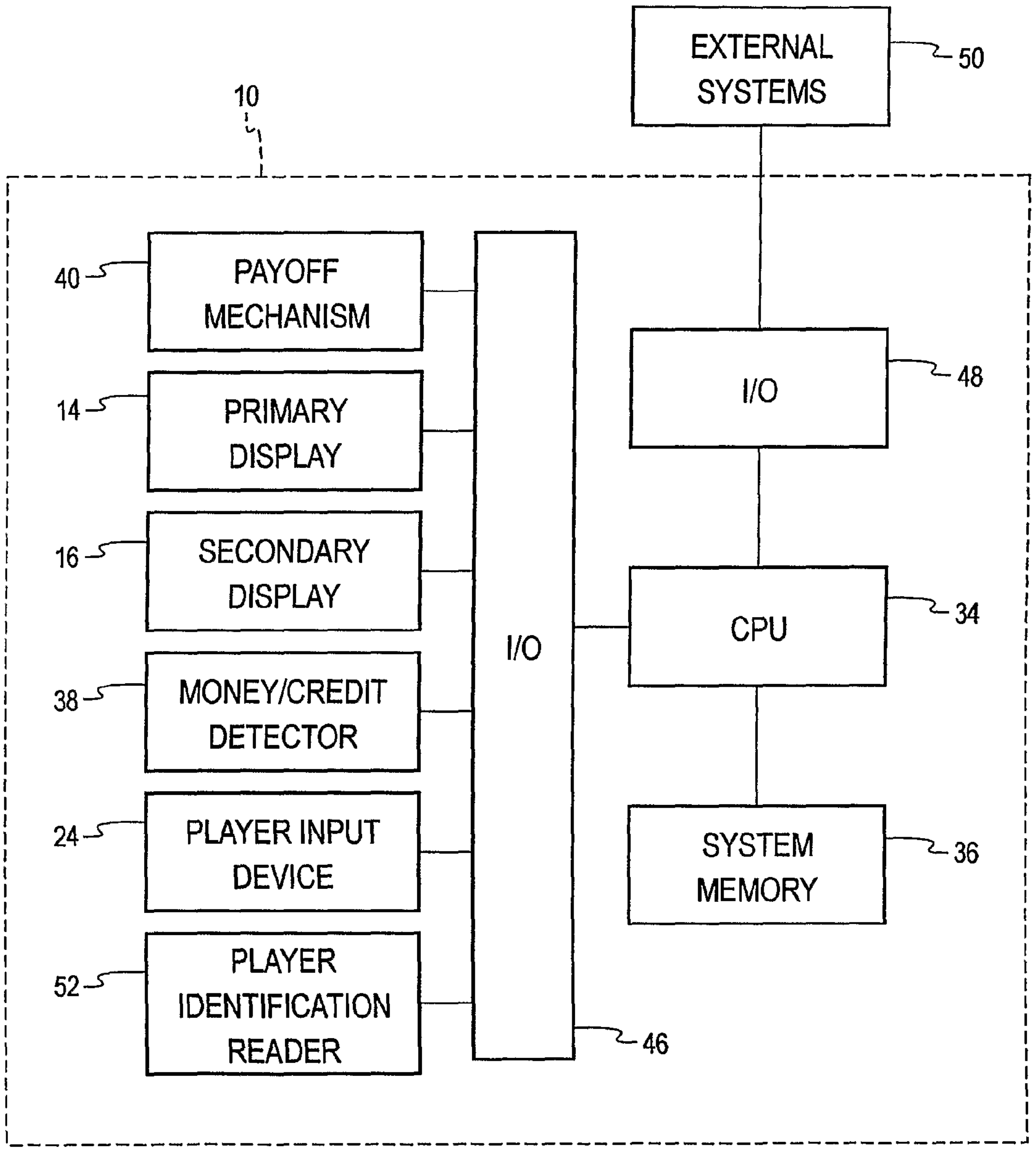
FIG. 2 is a block diagram of a control system suitable for operating the gaming machine of FIG. 1.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
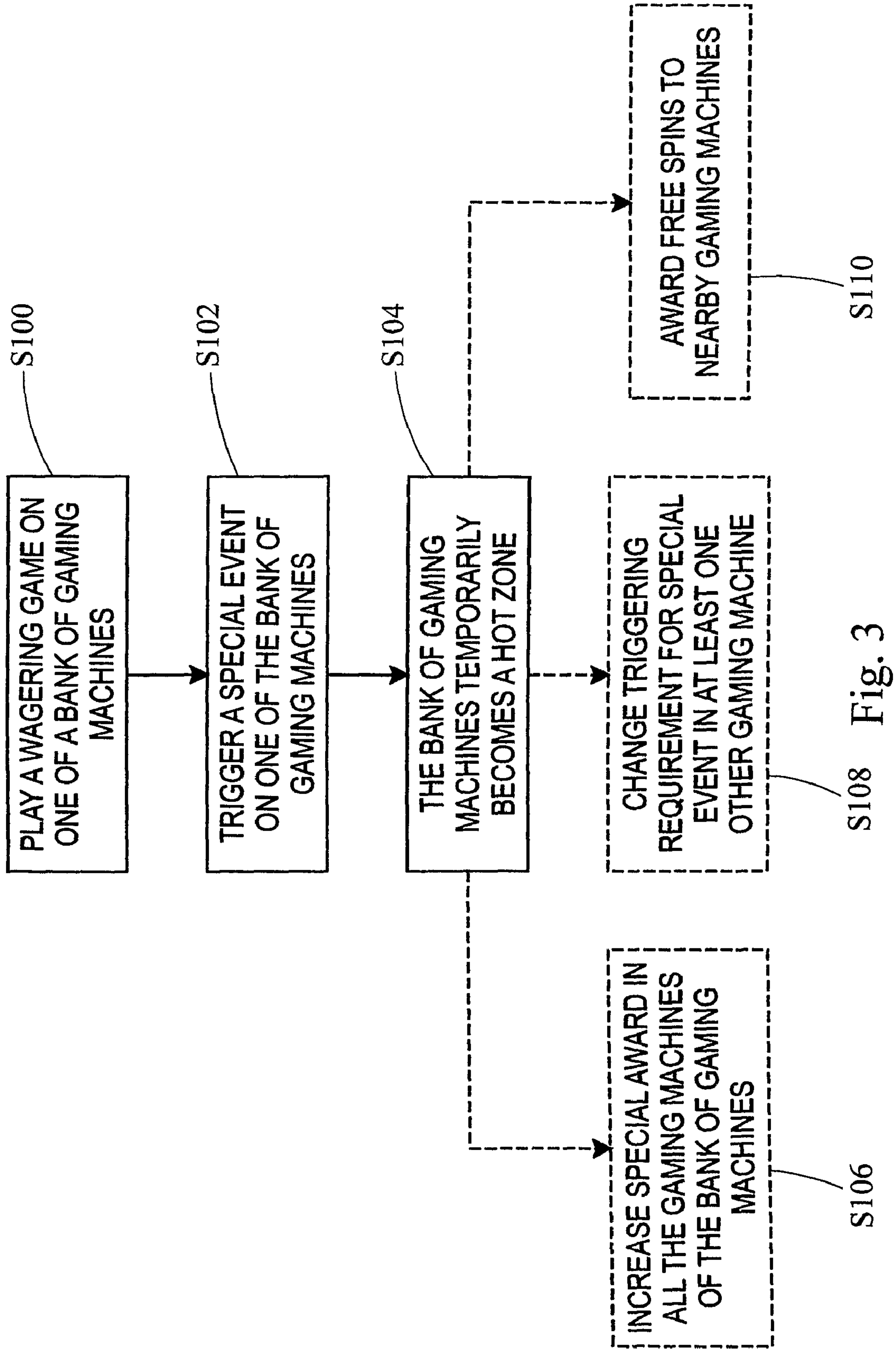
FIG. 3 is a flowchart representing a change of game conditions in a bank of gaming machines, according to one embodiment of the present invention.

Referring to FIG. 3, a flowchart represents playing a wagering game at a bank of gaming machines. At step S100, a player plays the wagering game on one gaming machine of the bank of gaming machines. The bank of gaming machines can include, for example, three gaming machines that are adjacent to each other and that are coupled to a large award signage, as described below in more detail in reference to FIGS. 4-6. Each gaming machine includes its own wagering game that can be played generally simultaneously and independently of other wagering games on the bank of gaming machines.

At step S102, a special event is triggered on any one gaming machine of the bank of gaming machines. The special event can be, for example, an in-machine progressive award or a group progressive award. The in-machine progressive award is a progressive award that is available only to players of the corresponding gaming machine and that increments from a base or reset value based solely on wagers received at the corresponding gaming machine. The group progressive award is a progressive award that is available to all the players of any gaming machine of the bank of gaming machines and that increments from a base or reset value based on wagers received at all machines in the bank. The special event is triggered, for example, when a predetermined symbol combination lands along an active payline of a gaming machine.

At step S104, the entire bank of gaming machines becomes a hot zone for a temporary time period. In response to the special event being triggered in one gaming machine of the bank of gaming machine, all the gaming machines become hot machines. A hot machine is, generally, a machine that receives an altered gaming condition for a predetermined period of time. For example, a hot machine is a machine that has a lower requirement for receiving a bonus award. Alternatively, only some of the gaming machines of the bank of gaming machines become hot machines.

At steps S106-S110, exemplary altered gaming conditions are described. For example, at step S106 a special award is increased in all the gaming machines of the bank of gaming machines. One example of the special award is an in-machine progressive award. For example, if the in-machine progressive award was $1,070.20 for each gaming machine before the triggering of the special event has occurred, the in-machine progressive award may temporally increase to $1,270.20 while the bank of gaming machines is a hot zone. Thus, all the players on the bank of gaming machines are more likely to continue playing, attempting to win the higher in-machine progressive award.

At step S108, a triggering requirement for the special event is also altered in at least one other gaming machine of the bank of gaming machines. For example, instead of requiring three matching trigger symbols to trigger the special event, the game may only require two matching trigger symbols to trigger the special event.

At step S110, free spins are awarded to one or more gaming machines that are near the gaming machine that has triggered the special event at step S102. For example, 10 free spins may be awarded to the two gaming machines that are adjacent to the triggering gaming machine. If one of the adjacent gaming machines triggers another special event, 10 free spins may be awarded to any adjacent gaming machine that is adjacent to the triggering gaming machine, etc.

Figure 4:
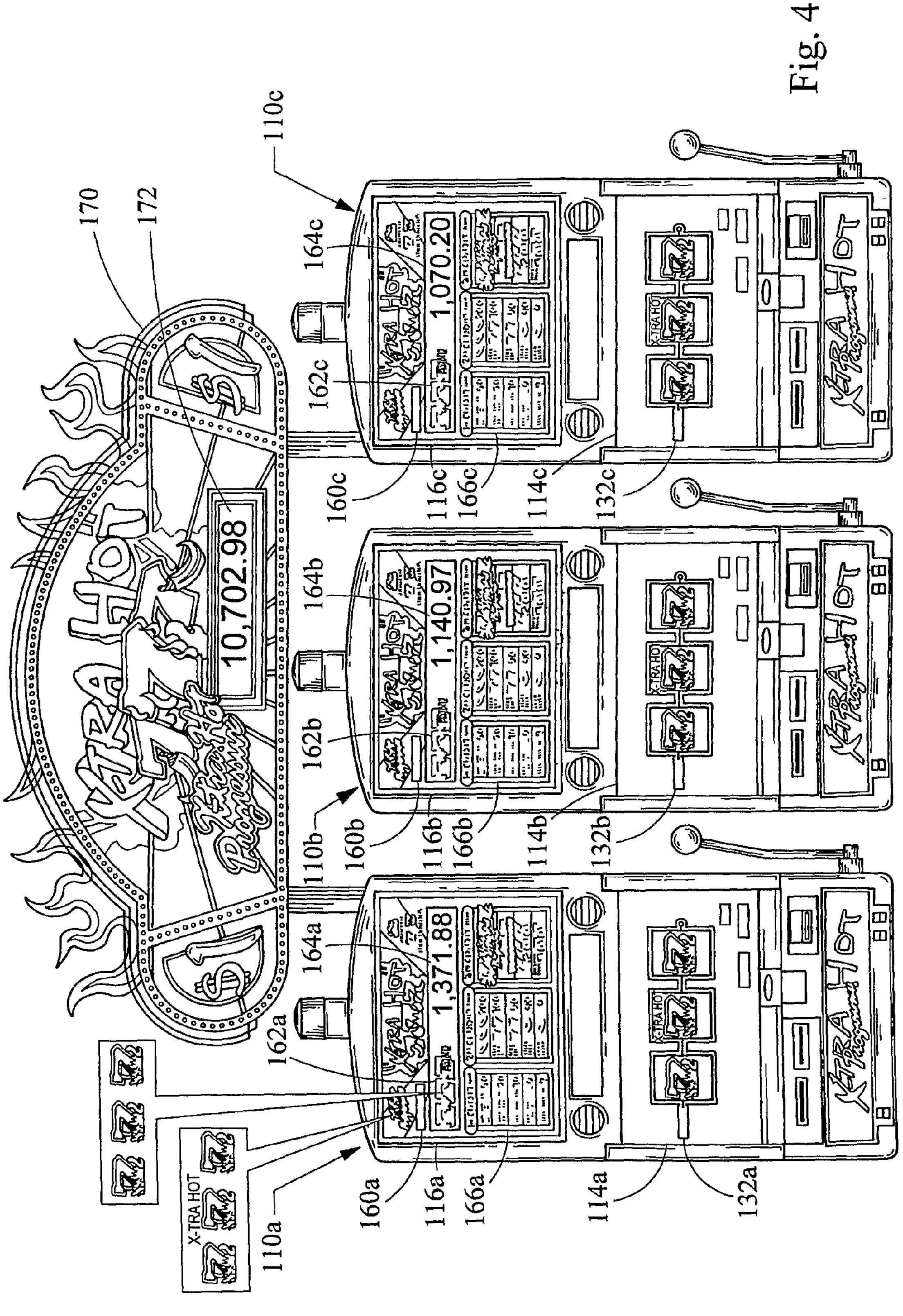
FIG. 4 is an elevation view representing a bank of gaming machines before a special event has been triggered, according to another embodiment of the present invention.

Referring to FIG. 4, a bank of gaming machines includes three gaming machines: a first gaming machine 110*a*, a second gaming machine 110*b*, and a third gaming machine 110*c*. The bank of gaming machines can include any number of gaming machines. Each gaming machine 110*a*-110*c* includes a corresponding primary display 114*a*-114*c* and secondary display 116*a*-116*c*. Each primary display 114*a*-114*c* displays a plurality of symbols along or near a payline 132*a*-132*c*, e.g., a "Hot 7," an "Xtra Hot 7," and another "Hot 7."

For example purposes, it is assumed that the "Xtra Hot 7" symbol can substitute for the "Hot 7" symbol and for the regular "7" symbol. In addition, it is assumed that the "Xtra Hot 7" symbol is less likely to land along and/or near the payline 132*a*-132*c* than any of the "Hot 7" symbol and the regular "7" symbol. Thus, the "Xtra Hot 7" symbol is the most desirable symbol out the three symbols, "Xtra Hot 7," "Hot 7," and "7." Similarly, it is assumed that the "Hot 7" symbol can substitute for the "7" symbol. In addition, it is assumed that the "Hot 7" symbol is less likely to land along and/or near the payline 132*a*-132*c* than the regular "7" symbol. Thus, the "Hot 7" symbol is more desirable than the regular "7" symbol. Thus, the "7" symbol is a lower symbol than the "Hot 7" symbol and the "Xtra Hot 7" symbol, and the "Hot 7" symbol is a lower symbol than the "Xtra Hot 7" symbol.

Each secondary display 116*a*-116*c* includes a group progressive indicator 160*a*-160*c*, an in-machine progressive requirement indicator 162*a*-162*c*, an in-machine progressive award indicator 164*a*-164*c*, and a paytable 166*a*-166*c*. The group progressive indicator 160*a*-160*c* is emphasized when the player of the corresponding gaming machine 110*a*-110*c* is permitted to play for the group progressive award. For example, the group progressive indicator 160*a*-160*c* is lit to show emphasis. Currently, as shown in FIG. 4, the group progressive indicator 160*a*-160*c* is not lit.

In addition, the group progressive indicator 160*a*-160*c* indicates the required condition for receiving the group progressive award. The embodiment of FIG. 4 shows that the group progressive award, e.g., the "Xtra Hot Progressive," is awarded when the combination of "Hot 7," "Xtra Hot 7," and "Hot 7" is aligned along the payline 132*a*-132*c*. Optionally, assuming that the "Xtra Hot 7" symbol can substitute for the "Hot 7" symbol, as described above, any combination of "Hot 7" symbols and "Xtra Hot 7" symbols having an "Xtra Hot 7" symbol in the center may trigger the group progressive award. For example, a combination of "Xtra Hot 7," "Xtra Hot 7," and "Hot 7" may trigger the group progressive award.

The in-machine progressive requirement indicator 162*a*-162*c* indicates the symbol combination required for awarding the in-machine progressive award. The exemplary embodiment shows that three "Hot 7s" are required for awarding the in-machine progressive award.

The in-machine progressive award indicator 164*a*-164*c* indicates the amount awarded if the player wins the in-machine progressive award. For example the in-machine progressive award indicator 164*a* of the first gaming machine 110*a* indicates an in-machine progressive award of "1,371.88," the in-machine progressive award indicator 164*b* of the second gaming machine 110*b* indicates an in-machine progressive award of "1,140,97," and the in-machine progressive award indicator 164*c* of the third gaming machine 110*c* indicates an in-machine progressive award of "1,070.20."

Each of the gaming machines 110*a*-110*c* is coupled to a group progressive signage 170, which includes a group progressive award indicator 172. As shown, the progressive award is "10,702.96." Each player of any of the gaming machines 110-110*c* may have the opportunity to win one or more of the corresponding in-machine progressive award and the group progressive award.

Figure 5:
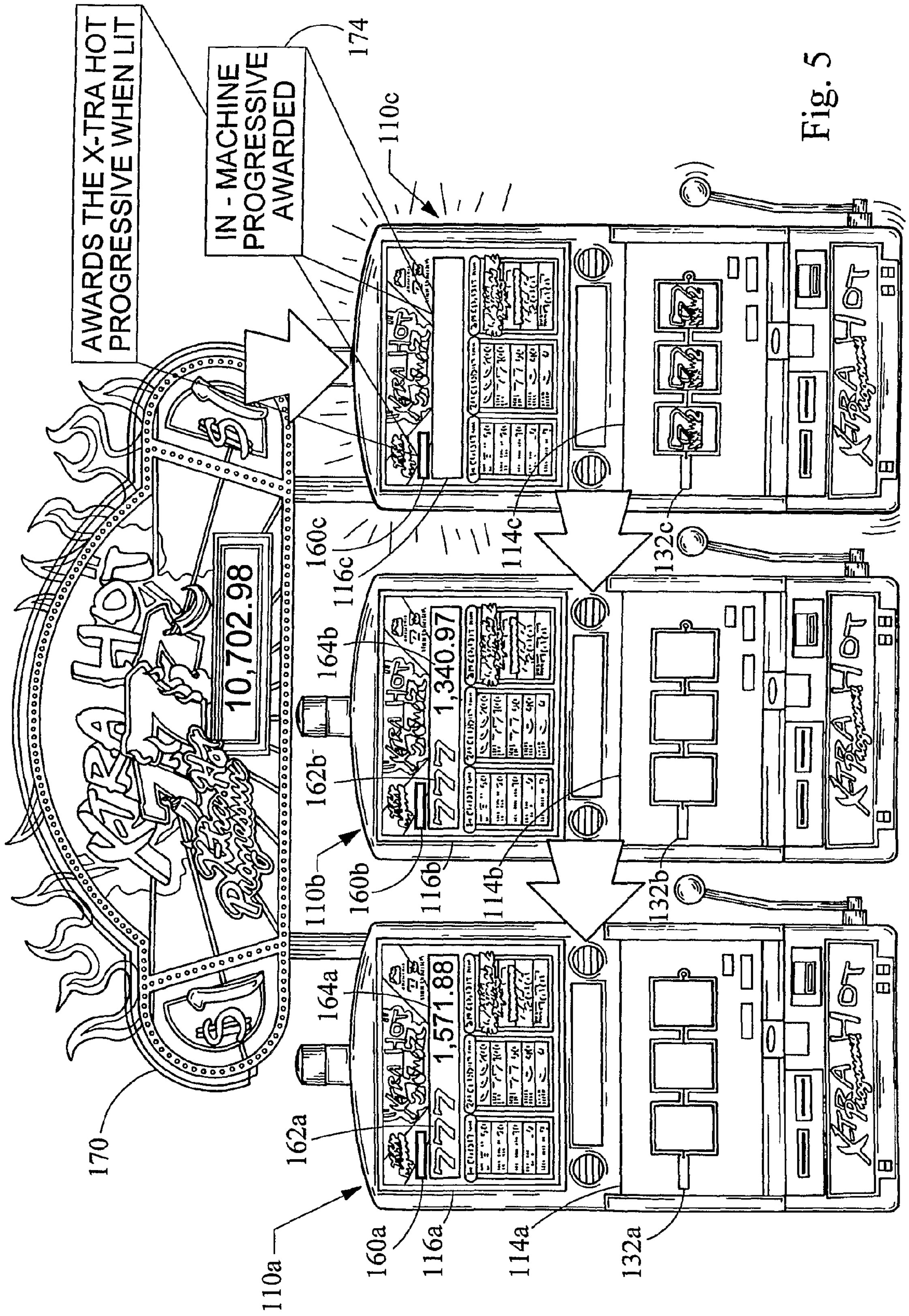
FIG. 5 is an elevation view of FIG. 5 representing the bank of gaming machines after the special event has been triggered.

Referring to FIG. 5, the third gaming machine 110*c* has achieved a symbol combination of three "Hot 7s" along the payline 132*c*. The three "Hot 7s" combination is the required symbol combination for awarding the in-machine progressive award of "1,070.20" (as shown in FIG. 4). Thus, the player of the third gaming machine 110*c* is awarded the in-machine progressive award, as indicated by the "In-Machine Progressive Awarded" notification 174, which replaces the in-machine progressive requirement indicator 162*c* and the in-machine progressive award indicator 164*c*.

In response to the in-machine progressive award of the third gaming machine 110*c* being awarded, the bank of gaming machines 110*a*-110*c* becomes a hot zone for sharing the excitement of winning the in-machine progressive award with all the players of the gaming machines 110*a*-110*c*. The hot zone provides altered gaming conditions for one or more of the gaming machines 110*a*-110*c*.

One gaming condition that is altered for each one of the gaming machines 110*a*-110*c* is directed to the ability to receive the group progressive award. As shown, each group progressive indicator 160*a*-160*c* is now lit, indicating that any player on the gaming machines 110*a*-110*c* that achieves the required triggering condition will be awarded the group progressive award of "10,702.98." Thus, any player that is the first player to achieve three "Hot 7s" along the payline 132*a*-132*c* will be awarded the group progressive award.

Another gaming condition that is altered for the gaming machines 110*a*-110*c* is directed to the requirement for triggering the corresponding in-machine progressive award. This gaming condition may apply only to the first gaming machine 110*a* and the second gaming machine 110*b* because the in-machine progressive award of the third gaming machine 110*c* has already been awarded, or may alternatively apply to all the gaming machines 110-110*c* in the bank. Instead of requiring three "Hot 7s" to trigger a corresponding in-machine progressive award, the symbol combination now requires three regular "7s" aligned along the payline 132*a*-132*c*. Assuming a regular "7" symbol is more heavily weighted than a "Hot 7" symbol, e.g., the regular "7" symbol is more likely to land along and/or near the payline 132*a*-132*c*, the player will be more excited to continue playing at least while the bank of gaming machines 110*a*-110*c* is in the hot zone. Alternatively or optionally, as previously discussed, the symbols may have a hierarchical value such that a "Hot 7" symbol can substitute for a regular "7" symbol. Thus, the altered gaming condition will allow the player to win the in-game progressive award if any combination of regular "7s" and "Hot 7s" are aligned along the payline 132*a*-132*c*.

Yet another gaming condition that is altered for the gaming machines 110*a*-110*c* is directed to the amount of the corresponding in-machine progressive award. This gaming condition may apply only to the first gaming machine 110*a* and the second gaming machine 110*b* because the in-machine progressive award of the third gaming machine 110*c* has already been awarded, or may alternatively apply to all the gaming machines 110*a*-110*c* in the bank. Each in-machine progressive award has been increased by 200 credits. Thus, the in-machine progressive award for the first gaming machine 110*a* has been increased from "1,371.80" to "1,571.80," and the in-machine progressive award for the second gaming machine 110*b* has been increased from "1,140.97" to "1,340.97."

In an alternative embodiment, regardless of whether the bank of gaming machines 110*a*-110*c* is in a hot zone, the group progressive award starts at $10,000 and is triggered by a combination of a "Hot 7," an "Xtra Hot 7," and a "Hot 7" centered on the corresponding payline 132*a*-132*c* when the player has wagered a maximum wager. However, when the bank of gaming machines 110*a*-110*c* is in a hot zone, the group progressive award may start at a higher amount, e.g., at $10,200, and/or may be triggered by a lower symbol requirement. For example, one lower symbol requirement may be a combination of a "7", a "Hot 7," and a "7." Optionally, when the bank of gaming machines 110*a*-110*c* is in a hot zone, the group progressive award may be triggered by a lower symbol requirement and the higher symbol requirement that is required when the bank is not in a hot zone. Thus, in the above-described example, when the bank of gaming machines 110*a*-110*c* is in a hot zone, the group progressive award may be triggered by either symbol requirement of the "Hot 7," "Xtra Hot 7," and "Hot 7," or "7," "Hot 7," and "7."

Similarly, regardless of whether the bank of gaming machines 110*a*-110*c* is in a hot zone, the in-machine progressive award starts at $1,000 and is triggered by three "Hot 7s" centered on the corresponding payline 132*a*-132*c* when the player has wagered a maximum wager. However, when the bank of gaming machines 110*a*-110*c* is in a hot zone, the in-machine progressive award may start at a higher amount, e.g., at $1,200, and/or may be triggered by a lower symbol requirement. For example, one lower symbol requirement may be a combination of three "7s." Optionally, when the bank of gaming machines 110*a*-110*c* is in a hot zone, the in-machine progressive award may be triggered by a lower symbol requirement and the higher symbol requirement that is required when the bank is not in a hot zone. Thus, in the above-described example, when the bank of gaming machines 110*a*-110*c* is in a hot zone, the in-machine progressive award may be triggered by either symbol requirement of three "Hot 7s" or "7s."

The duration of the hot zone can be determined by various factors. For example, the duration can be determined by a fixed number of spins, a predetermined number of prequalified spins, a combination of symbols, etc. In one example, the hot zone ends when the player that achieved the triggering of the hot zone has conducted 10 spins, i.e., a fixed number of spins. In another example, the hot zone ends when the player exhausts his or her number of prequalified spins. One exemplary prequalification criteria may be the number of wagers that the player has placed in the previous week at a gaming establishment. The higher the number of wagers, the higher the number of prequalified spins. For example, player A places twenty wagers in the previous week at the gaming establishment and, in return, receives five prequalified spins. In contrast, player B places four wager in the previous week at the gaming establishment and, in return, receives one prequalified spin. Thus, a player that plays frequently is rewarded for his or her loyalty to the gaming establishment. In yet another example, the hot zone ends when the total award for all the gaming machines 110*a*-110*c* surpasses $100.

Figure 6:
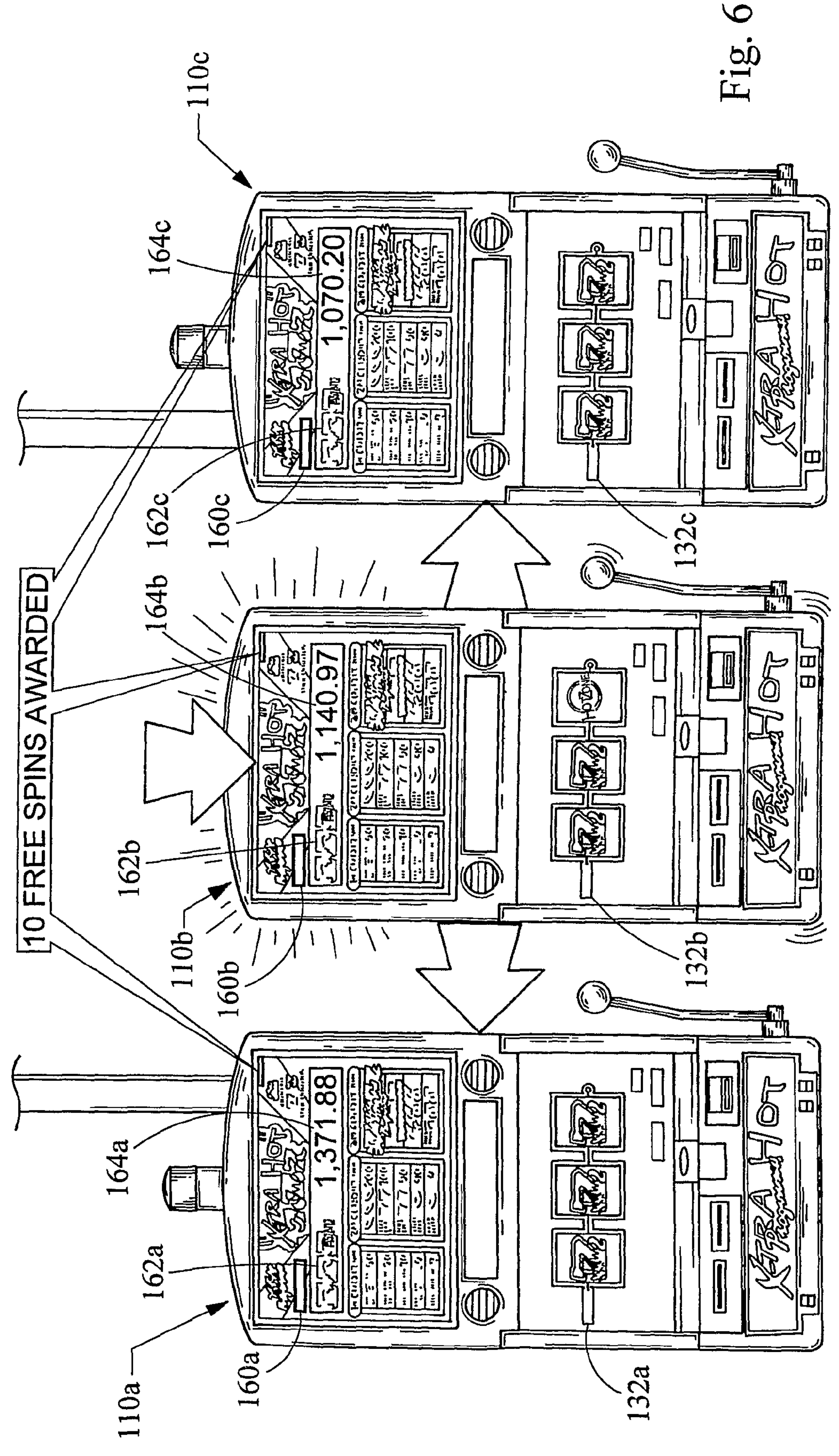
FIG. 6 is an elevation view representing a bank of gaming machines after a plurality of free spins has been awarded to some of the gaming machines, according to yet another embodiment of the present invention.

Referring to FIG. 6, the gaming machines 110*a*-110*c* provide a hot zone "Free Spins" award, according to an alternative embodiment of the present invention. In the illustrated example, the hot zone "Free Spins" award is triggered by a hot zone symbol centered on the payline 132*b* of the second gaming machine 110*b*. The player of the second gaming machine 110*b* is awarded 10 free spins.

In response to the "Free Spins" award being triggered to the player of the second gaming machine 110*b*, the machines adjacent to the second gaming machine 110*b* are also awarded 10 free spins. Thus, the players of the first gaming machine 110*a* and the third gaming machine 110*c* are each awarded 10 free spins.

During the free spins, if a hot zone symbol is positioned on or within one position of the payline 132*a*-132*c*, then the "Free Spins" award is retriggered. Thus, if any gaming machine 110*a*-110*c* retriggers the "Free Spins" award, the adjacent gaming machines are awarded 10 additional free spins, possibly creating a "ripple effect" around the bank. Although only three gaming machines are illustrated in FIG. 6, the bank can include any number of gaming machines. Thus, if it is assumed that the bank includes eight gaming machines, for example, the "ripple effect" of free spins can potentially reach all the gaming machines. The excitement of winning free spins, which is initially experienced by the first player that initially triggers the free spins, is shared by the player's neighbors. Then, as the "ripple effect" of the free spins spreads to additional adjacent neighbors, the effect of receiving free spins from a neighbor translates into a wave of excited players.

While the present invention has been described with reference to one or more particular embodiments, those skilled in the art will recognize that many changes may be made thereto without departing from the spirit and scope of the present invention.

In alternative embodiments, the hot zone may include any number and/or combination of gaming machines included in a bank of gaming machines. For example, the hot zone can be limited only to nonadjacent gaming machines of the triggering gaming machine. Optionally, the special event can include any number of progressive awards and/or any combination of progressive awards, bonus games, jackpot awards, etc. For example, in one alternative embodiment the in-machine progressive award can be replaced with a non-progressive jackpot award. When the jackpot award is triggered, the bank becomes a hot zone.

In yet another alternative embodiment, the triggering of the hot zone can occur in response to any predetermined condition. For example, the triggering can occur in response to finding a missing puzzle, solving a murder mystery, catching a big fish, guessing a pea under a shell, correctly rearranging a phrase, etc.

In yet another alternative embodiment, a special award may be awarded to only certain ones of the gaming machines in a bank of gaming machines. For example purposes, it is assumed that the bank of gaming machines includes seven gaming machines A-G. It is further assumed that gaming machine D triggers a criterion that makes the bank of gaming machines a hot zone. In this example, gaming machine D receives a plurality of free spins and, consequently, adjacent gaming machines C and E also receive the plurality of free spins. If gaming machine B retriggers the bonus, gaming machines A and C also receive the retriggered bonus because they are adjacent to gaming machine B. Optionally, the retriggered bonus is also awarded to gaming machine D as a reward because gaming machine D initially started the hot zone. Thus, the initial triggering gaming machine is rewarded for initiating the hot zone.

In a further alternative embodiment, referring to the above-described example, a triggering bonus is awarded such that the chain of gaming machines is enlarged each time the triggering bonus is retriggered. It is assumed that gaming machine D initiates the hot zone. At this point, gaming machines C, D, and E are part of the chain. If gaming machine C retriggers the bonus, the bonus is awarded not only to gaming machines C, D, and E, but also to the gaming machines that are adjacent to the chain. Thus, the retriggered bonus is also awarded to gaming machines B and F. Accordingly, the chain has been enlarged from the initial chain of gaming machines C, D, and E to a subsequent, and larger, chain B, C, D, E, and F.

Each of these embodiments and obvious variations thereof is contemplated as falling within the spirit and scope of the claimed invention, which is set forth in the following claims.

What is claimed is:

1. A computer-implemented method of conducting wagering games on a plurality wagering game machines, the plurality of wagering game machines including one or more input devices, one or more display devices, and one or more processors, the method comprising:

receiving, via at least one of the one or more input devices, a wager to initiate a first wagering game on a first gaming machine of the plurality of gaming machines;

displaying, via at least one of the one or more display devices, the first wagering game;

randomly selecting, via at least one of the one or more processors, a first game outcome from a plurality of game outcomes, wherein at least one of the plurality of game outcomes is a special event triggering outcome; and in direct response to the randomly selected first game outcome being the special event triggering outcome, (i) presenting a special event to the first gaming machine on at least one of the one or more display devices, and (ii) altering, via at least one of the one or more processors, a game symbol combination in a second wagering game being conducted on at least one different gaming machine of the plurality of gaming machines, wherein the game symbol combination causes an award of a designated award when displayed during the second wagering game.

2. The method of claim 1, wherein the special event is at least one of a group progressive award and an in-machine progressive award.

3. The method of claim 1, wherein the special event triggering outcome comprises displaying, via at least one of the one or more display devices, a predetermined game symbol combination in the first wagering game.

4. The method of claim 1, wherein the at least one different gaming machine is selected from the group consisting of any gaming machines of the plurality of gaming machines that are adjacent to the first gaming machine.

5. The method of claim 4, further comprising:

in direct response to the designated award including a special event triggering outcome in the second wagering game, altering, via at least one of the one or more processors, a game condition of a third wagering game on at least one additional gaming machine selected from the group consisting of any gaming machines of the plurality of gaming machines that are adjacent to the second gaming machine.

6. The method of claim 1, wherein the game symbol combination remains altered for one of a predetermined time period, a predetermined number of spins, and successive spins until the occurrence of a predetermined symbol outcome.

7. The method of claim 1, wherein altering the game symbol combination includes reducing the number of symbols needed to award the designated award.

8. The method of claim 1, further comprising displaying a special event award associated with the special event on a signage connected to the first and second gaming machines.

9. The method of claim 1, wherein presenting a special event includes providing an additional award in the first wagering game.

10. A gaming system configured to conduct wagering games on a plurality of gaming machines, the gaming system comprising:

one or more input devices for receiving player inputs;

one or more display devices;

one or more processors; and one or more memory devices storing instructions that, when executed by at least one of the one or more processors, cause the gaming system to:

receive an indication of a wager from a player to initiate a first wagering game on a first gaming machine of a plurality of gaming machines;

display the first wagering game on at least one of the one or more display devices;

randomly select one of a plurality of first game outcomes for the first wagering game, wherein at least one of the plurality of first game outcomes is a special event triggering outcome; and in direct response to the randomly selected first game outcome being the special event triggering outcome, (i) presenting a special event to the first gaming machine, and (ii) alter a game symbol combination in a second wagering game being conducted on at least one different gaming machine of the plurality of gaming machines, wherein the game symbol combination causes an award of a designated award when displayed during the second wagering game.

11. The gaming system of claim 10, wherein the special event triggering outcome comprises displaying, via at least one of the one or more display devices, a predetermined game symbol combination in the first wagering game.

12. The gaming system of claim 10, wherein the at least one different gaming machine is selected from the group consisting of any gaming machines of the plurality of gaming machines that are adjacent to the first gaming machine.

13. The gaming system of claim 12, wherein the at least one memory device further stores instruction that, when executed by at least one of the one or more processors, cause the gaming system to:

alter, in direct response to the designated award including a special event triggering outcome in the second wagering game, a game condition of a third wagering game on at least one additional gaming machine selected from the group consisting of any gaming machines of the plurality of gaming machines that are adjacent to the second gaming machine.

14. The gaming system of claim 10, wherein the game symbol combination remains altered for one of a predetermined time period, a predetermined number of spins, and successive spins until the occurrence of a predetermined symbol outcome.

15. The gaming system of claim 10, wherein altering the game symbol combination includes reducing the number of symbols needed to award the designated award.

16. A computer-readable, non-transitory medium including executable instructions that, when executed by one or more processors, cause at least one of the one or more processors to operate with one or more input devices and one or more display devices to:

receive, via at least one of the one or more input devices, an indication of a wager to initiate a first wagering game on a first gaming machine of the plurality of gaming machines;

display, via at least one of the one or more display devices, the first wagering game;

randomly select, via at least one of the one or more processors, one of a plurality of first game outcomes for the first wagering game, wherein at least one of the plurality of first game outcomes is a special event triggering outcome; and in direct response to the randomly selected first game outcome being the special event triggering outcome, (i) present a special event to the first gaming machine on at least one of the one or more display devices, and (ii) alter, a game symbol combination in a second wagering game being conducted on at least one different gaming machine of the plurality of gaming machines, wherein the game symbol combination causes an award of a designated award when displayed during the second wagering game.

17. The computer-readable, non-transitory medium of claim 16, wherein the special event is at least one of a group progressive award and an in-machine progressive award.

18. The computer-readable, non-transitory medium of claim 16, wherein the special event triggering outcome comprises displaying, via at least one of the one or more display devices, a predetermined game symbol combination in the first wagering game.

19. The computer-readable, non-transitory medium of claim 16, wherein the at least one different gaming machine is selected from the group consisting of any gaming machines of the plurality of gaming machines that are adjacent to the first gaming machine.

20. A gaming system configured to conduct wagering games on a plurality of networked gaming machines, each gaming machine of the plurality of networked gaming machines conducting a wagering game simultaneously and independently of the other gaming machines of the plurality of networked gaming machines, the gaming system comprising:

a game server connected to the plurality of networked gaming machines via a communications network;

one or more input devices for receiving player inputs;

one or more processors; and one or more memory devices storing instructions that, when executed by at least one of the one or more processors, cause the gaming system to:

receive an indication of a wager to initiate a first wagering game on a first gaming machine of the plurality of networked gaming machines;

display the first wagering game on at least one of the one or more display devices;

randomly select, via at least one of the one or more processors, one of a plurality of first game outcomes for the first wagering game, wherein at least one of the plurality of first game outcomes is a special event triggering outcome; and in direct response to the randomly selected first game outcome being the special event triggering outcome, (i) present a special event to the first gaming machine on at least one of the one or more display devices, and (ii) alter a game symbol combination in a second wagering game being conducted on at least one different gaming machine of the plurality of gaming machines, wherein the game symbol combination causes an award of a designated award when displayed during the second wagering game.

21. The gaming system of claim 20, wherein at least the altering of the game symbol combination in the second wagering game is performed by a first processor of the one or more processors executing instructions stored on a first memory device of the one or more memory devices, the first processor and the first memory device residing in the game server.

22. The gaming system of claim 20, wherein the special event triggering outcome comprises displaying, via at least one of the one or more display devices, a predetermined game symbol combination in the first wagering game.

23. The gaming system of claim 20, wherein the at least one different gaming machine is selected via the game server from the group consisting of any gaming machines of the plurality of networked gaming machines that are adjacent to the first gaming machine.

24. A first gaming machine configured to conduct a wagering game while connected for communication to a second gaming machine, the first gaming machine comprising:

one or more input devices for receiving player inputs;

one or more display devices for displaying game images of the wagering game on the first gaming machine;

one or more processors; and at least one memory device storing instructions that, when executed by at least one of the one or more processors, cause the first gaming machine to:

receive an indication of a wager to initiate a first wagering game;

randomly select a first game outcome of a plurality of first game outcomes, the plurality of first game outcomes including at least one special event triggering outcome;

display a first symbol combination representing the first game outcome; and in direct response to the first game outcome being the at least one special event triggering outcome, (i) present a special event to the first wagering game on at least a first of the one or more display devices, and (ii) communicate to the second gaming machine an instruction that causes the second gaming machine to alter, via at least one of the one or more processors, a game symbol combination in at least a second wagering game being conducted on the second gaming machine, wherein the game symbol combination causes an award of a designated award when displayed on at least a second-gaming-machine display device.

25. The gaming machine of claim 24, wherein altering the game symbol combination on the second gaming machine includes reducing the number of symbols needed to award the designated award.

* * * * *